(12) United States Patent
Evett

(10) Patent No.: US 8,925,417 B2
(45) Date of Patent: Jan. 6, 2015

(54) BICYCLE TRANSMISSION SHIFT CONTROL APPARATUS

(76) Inventor: Joel Evett, Stow, MA (US)

( * ) Notice: Subject to any disclaimer, the term of this patent is extended or adjusted under 35 U.S.C. 154(b) by 1427 days.

(21) Appl. No.: 12/299,291

(22) PCT Filed: May 1, 2007

(86) PCT No.: PCT/US2007/010473
§ 371 (c)(1),
(2), (4) Date: Mar. 13, 2009

(87) PCT Pub. No.: WO2007/130360
PCT Pub. Date: Nov. 15, 2007

(65) Prior Publication Data
US 2009/0217780 A1 Sep. 3, 2009

Related U.S. Application Data

(60) Provisional application No. 60/796,187, filed on May 1, 2006, provisional application No. 60/810,128, filed on Jun. 2, 2006, provisional application No. 60/851,997, filed on Oct. 17, 2006.

(51) Int. Cl.
| *F16C 1/10* | (2006.01) |
| *G05G 7/02* | (2006.01) |
| *B62K 23/06* | (2006.01) |
| *B62M 25/04* | (2006.01) |
| *G05G 1/04* | (2006.01) |

(52) U.S. Cl.
CPC *G05G 7/02* (2013.01); *B62K 23/06* (2013.01); *B62M 25/04* (2013.01); *G05G 1/04* (2013.01)
USPC ........................................................ 74/502.2

(58) Field of Classification Search
USPC ............... 74/473.13, 473.14, 473.15, 500.5, 74/501.6
See application file for complete search history.

(56) References Cited

U.S. PATENT DOCUMENTS

| 3,965,763 | A | 6/1976 | Wechsler |
| 5,479,776 | A | 1/1996 | Romano |
| 5,590,564 | A * | 1/1997 | Kishimoto ................ 74/473.13 |
| 6,993,995 | B2 * | 2/2006 | Fujii .......................... 74/502.2 |
| 2001/0031682 | A1 | 10/2001 | Auer et al. |
| 2003/0074997 | A1 * | 4/2003 | Wesling et al. ........... 74/473.12 |

FOREIGN PATENT DOCUMENTS

| DE | 3916919 | 11/1989 |
| DE | 44 13 610 | 11/1994 |
| EP | 1 127 782 | 8/2001 |

OTHER PUBLICATIONS

International Search Report and Written Opinion mailed Sep. 9, 2008, directed to PCT/US07/10473; 8 pages.
European Supplementary Search Report mailed Apr. 12, 2010, directed to European Patent Application No. 07794432.0; 6 pages.
International Preliminary Report on Patentability dated Nov. 27, 2008, directed to International Patent Application No. PCT/US2007/010473; 5 pages.

* cited by examiner

*Primary Examiner* — Vicky Johnson
(74) *Attorney, Agent, or Firm* — Mendelsohn, Drucker & Dunleavy, P.C.

(57) ABSTRACT

A bicycle transmission shifting device that includes a cable having a portion of the cable attached to a derailleur and also having another portion of the cable attached to a cable drum. Rotation of the cable drum in one direction pulls the cable to move the derailleur to move a bike chain in a first direction to change gears. Rotation of the cable drum in a second direction pulls or releases tension in the cable to move the derailleur to move the bike chain in a second direction to change gears.

14 Claims, 14 Drawing Sheets

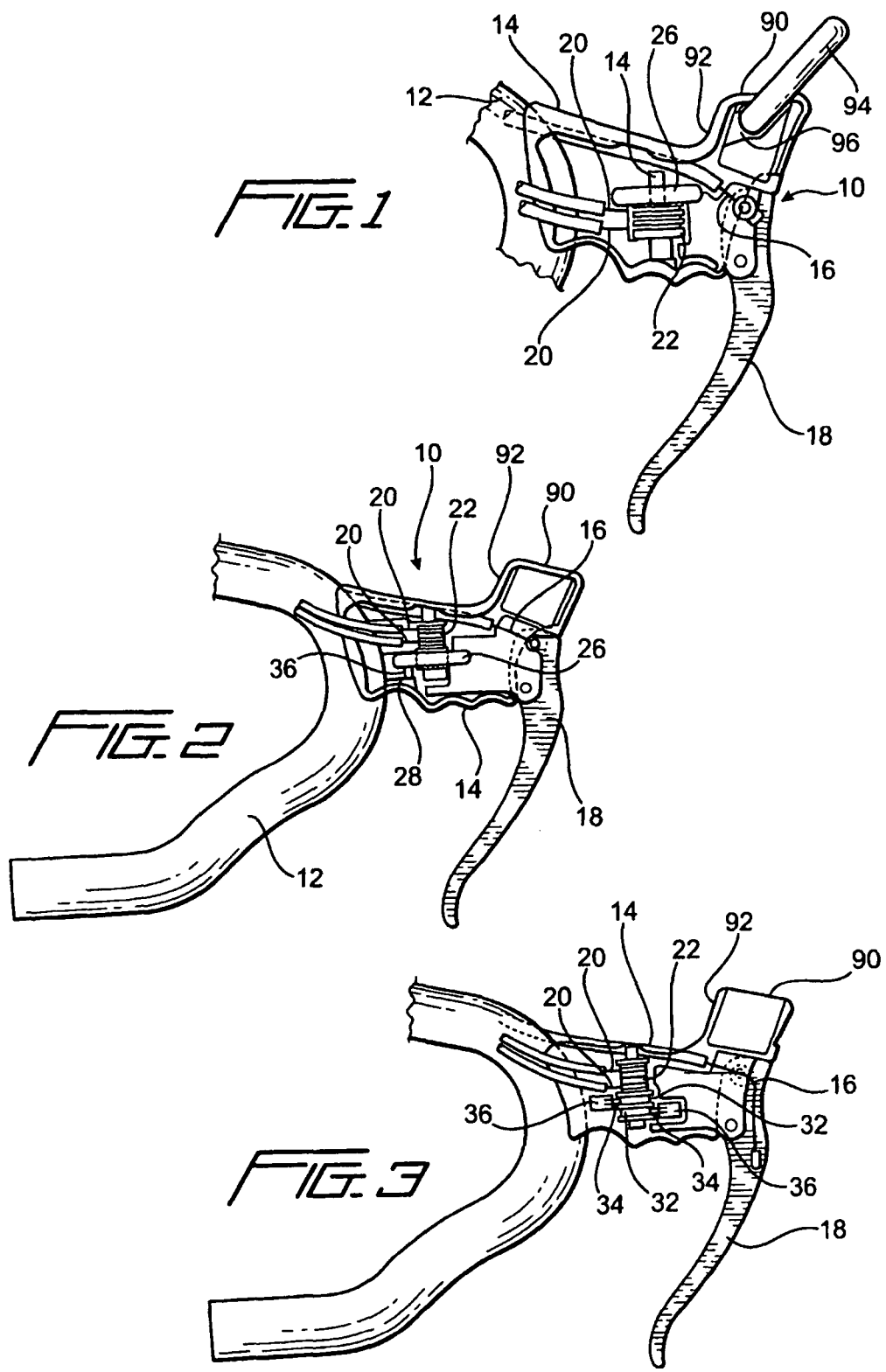

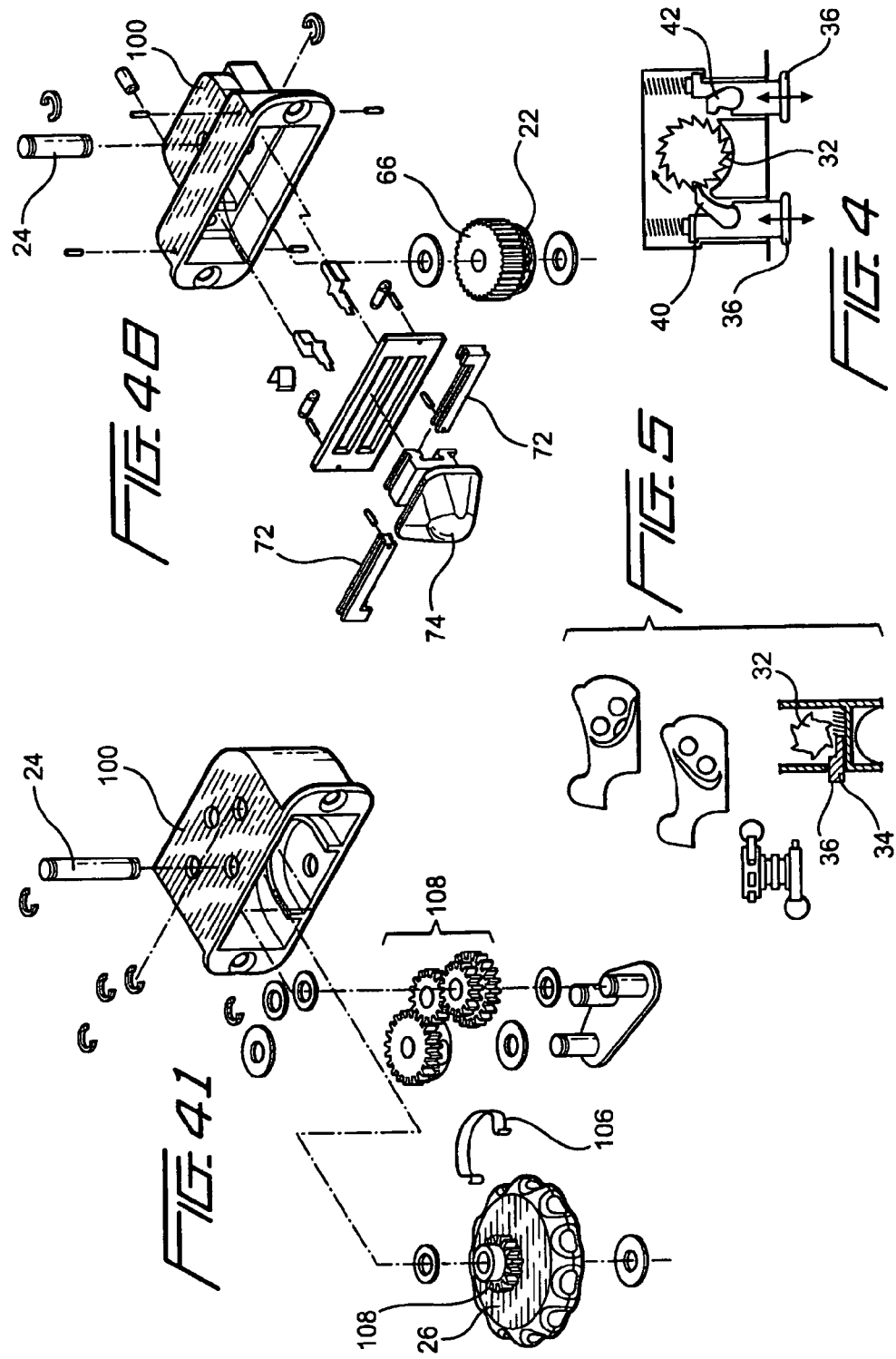

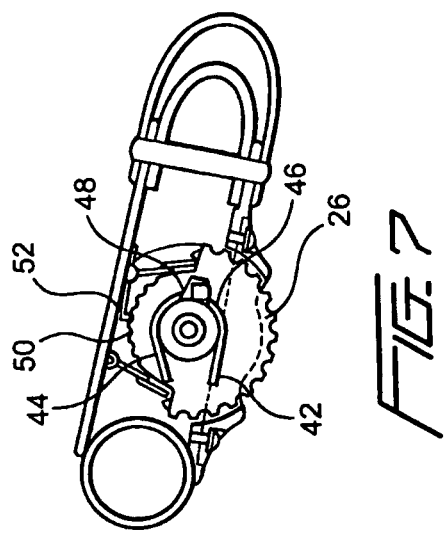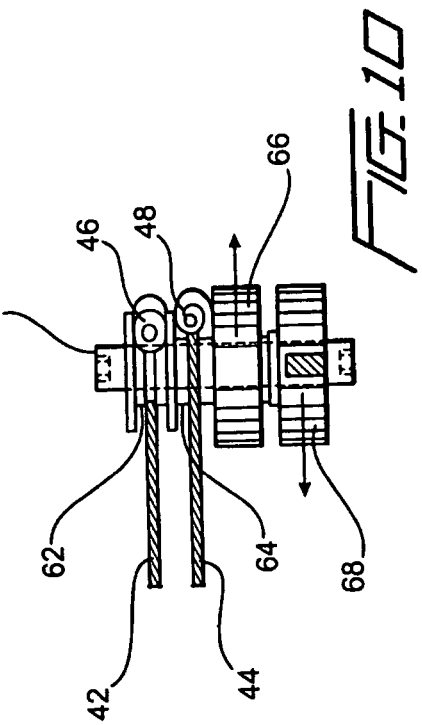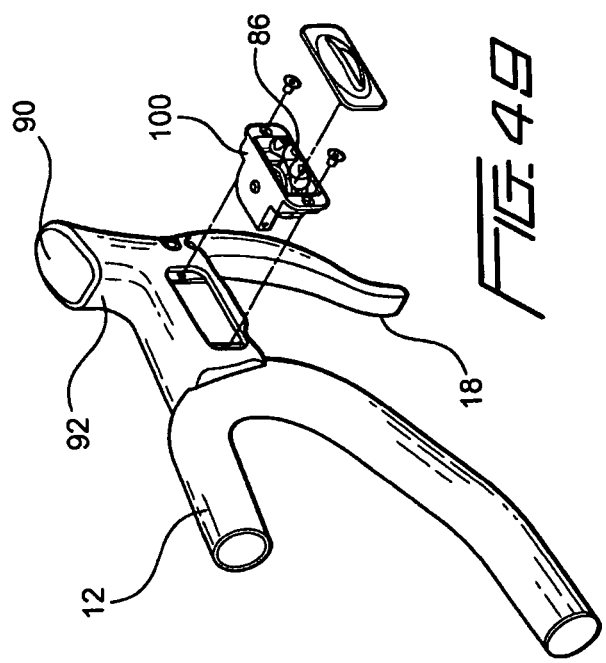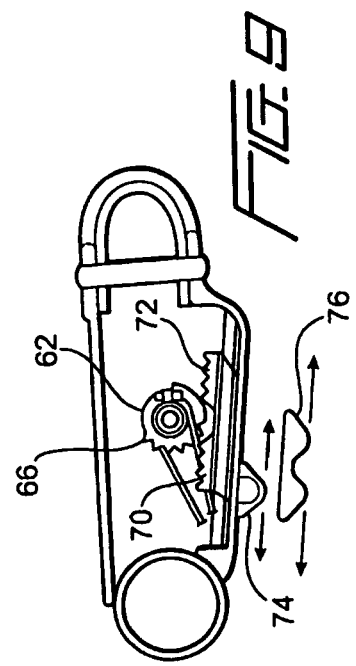

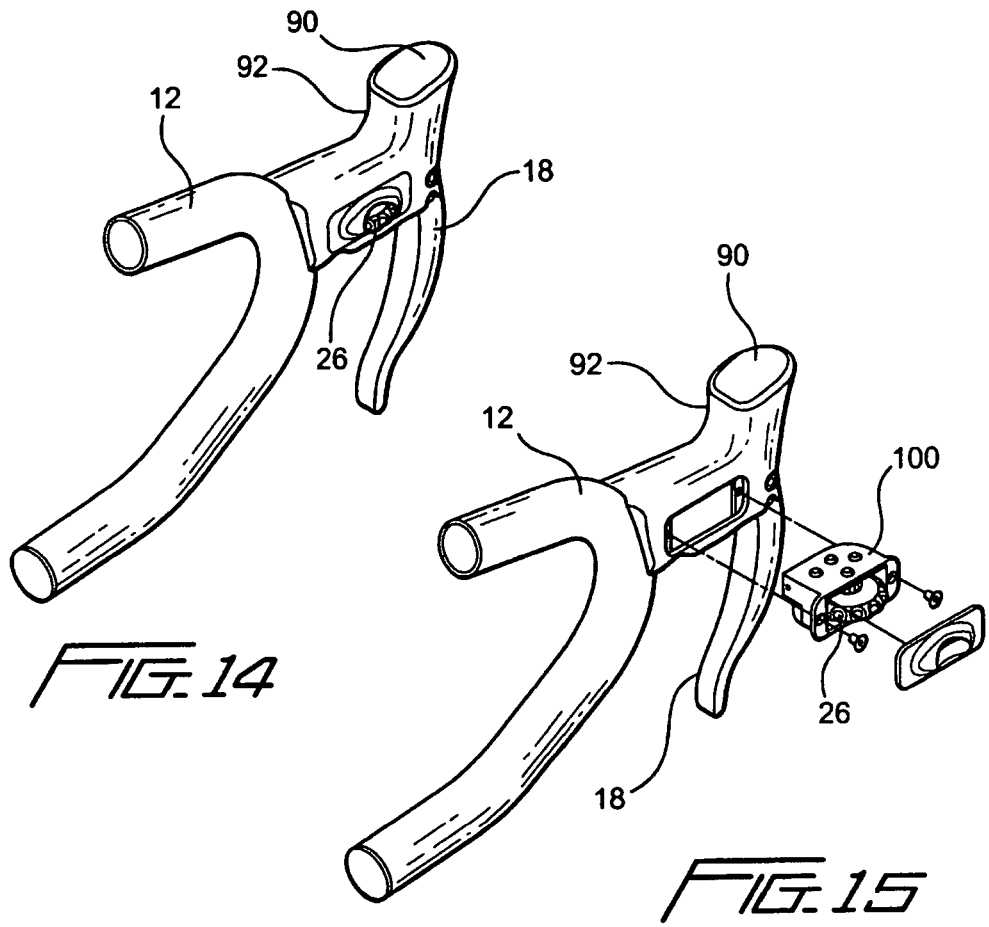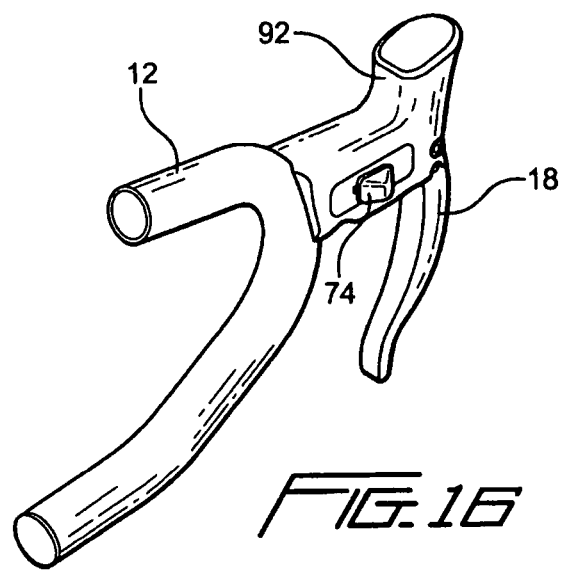

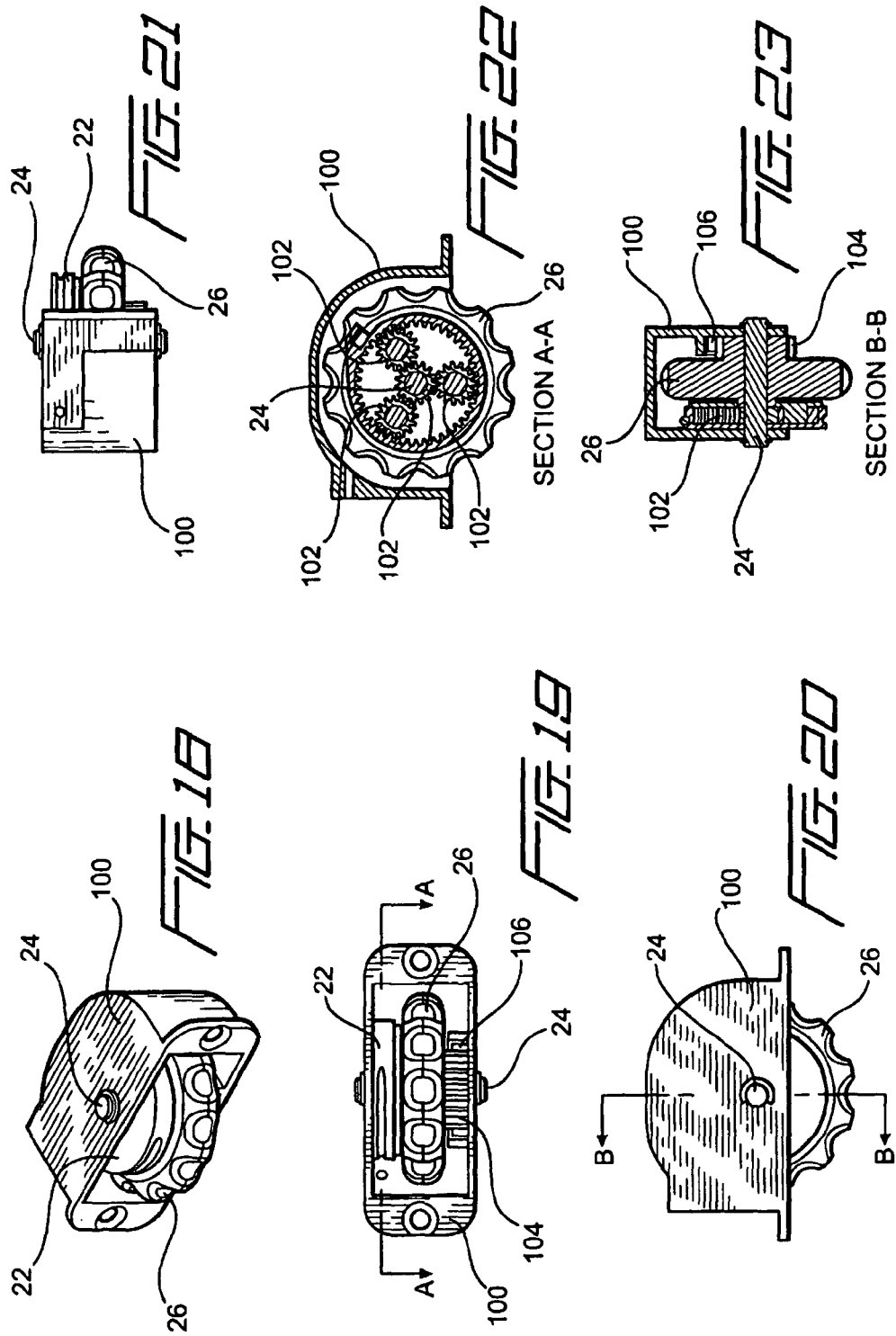

SECTION B-B

SECTION C-C

SECTION A-A

SECTION B-B

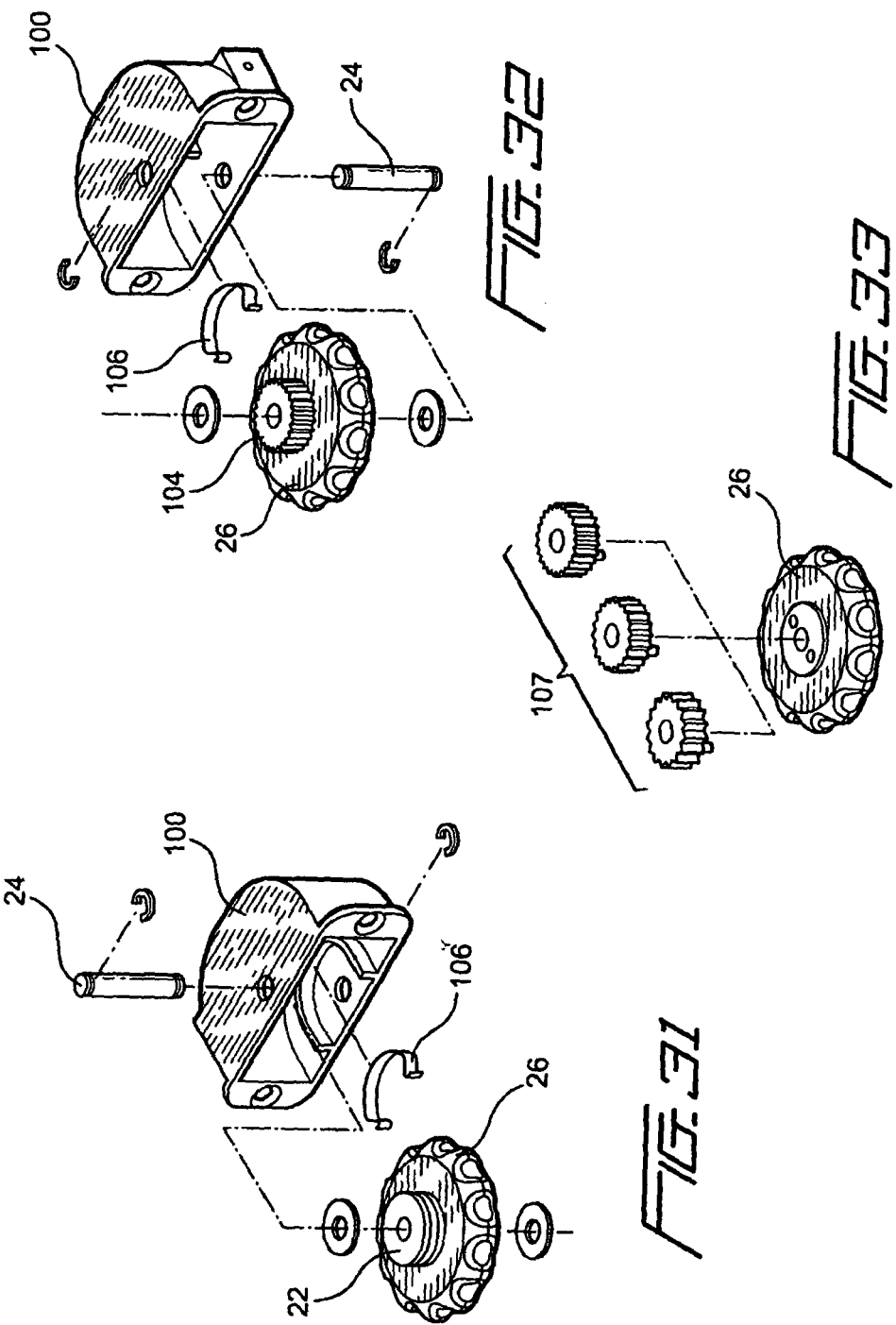

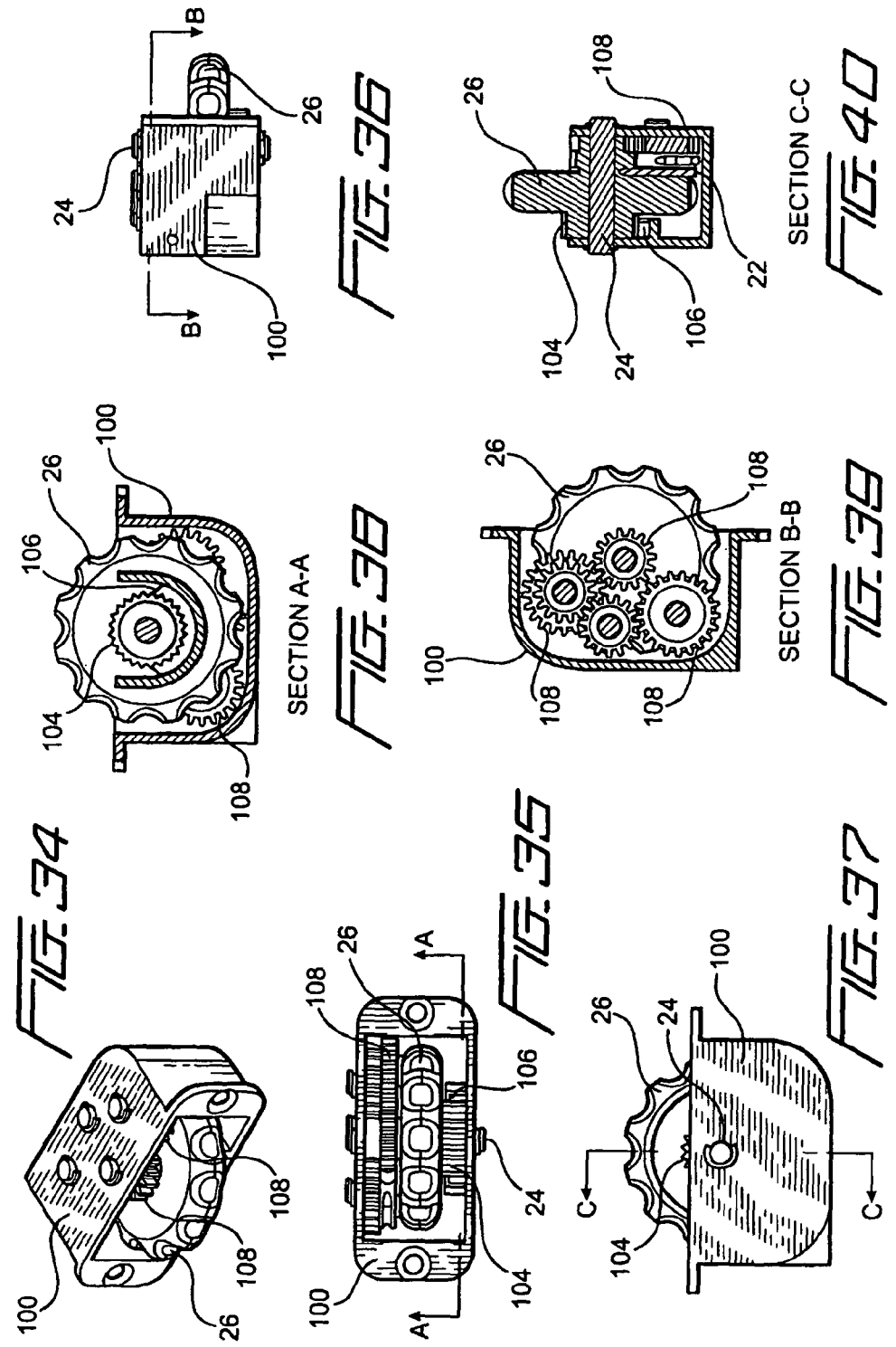

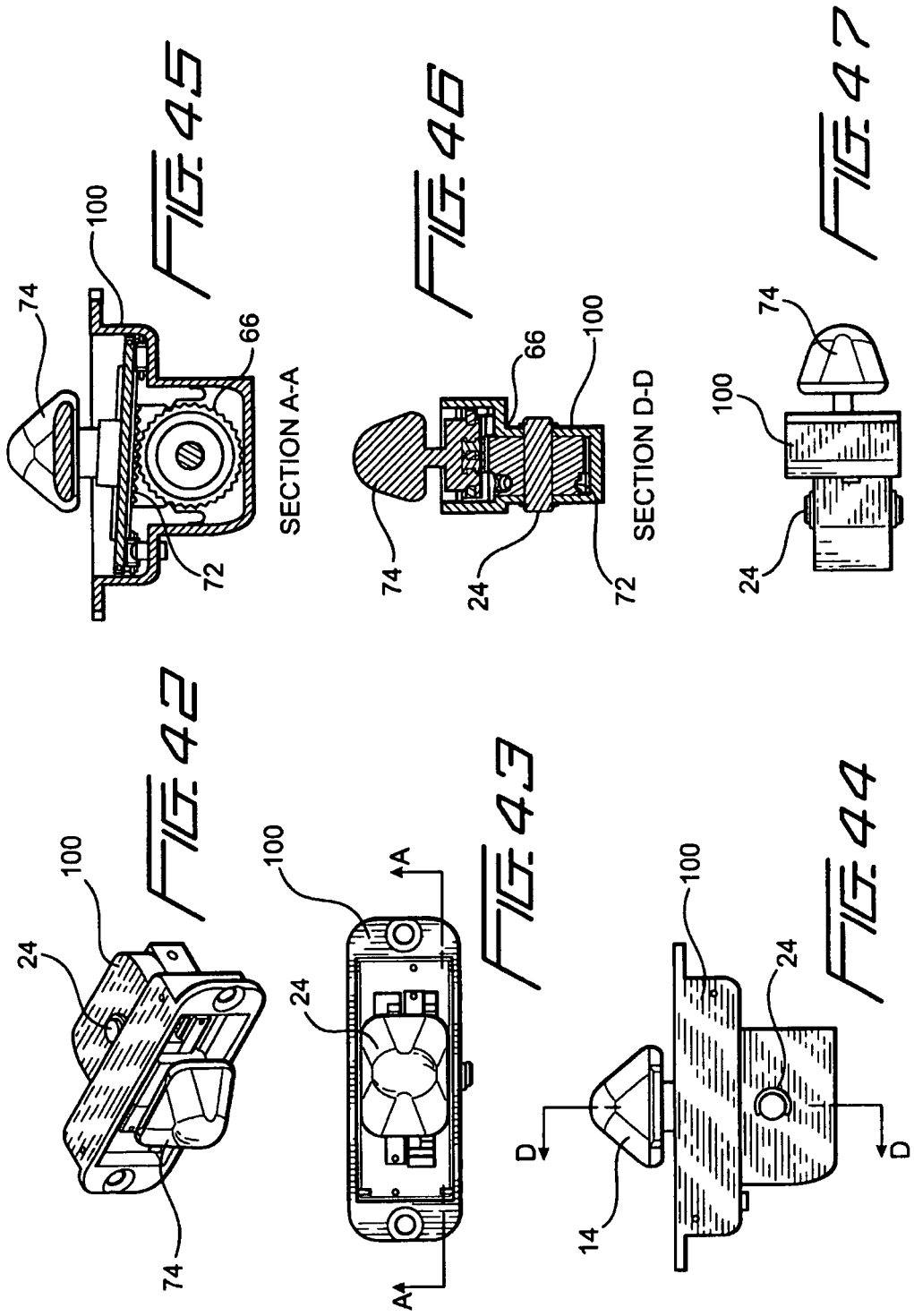

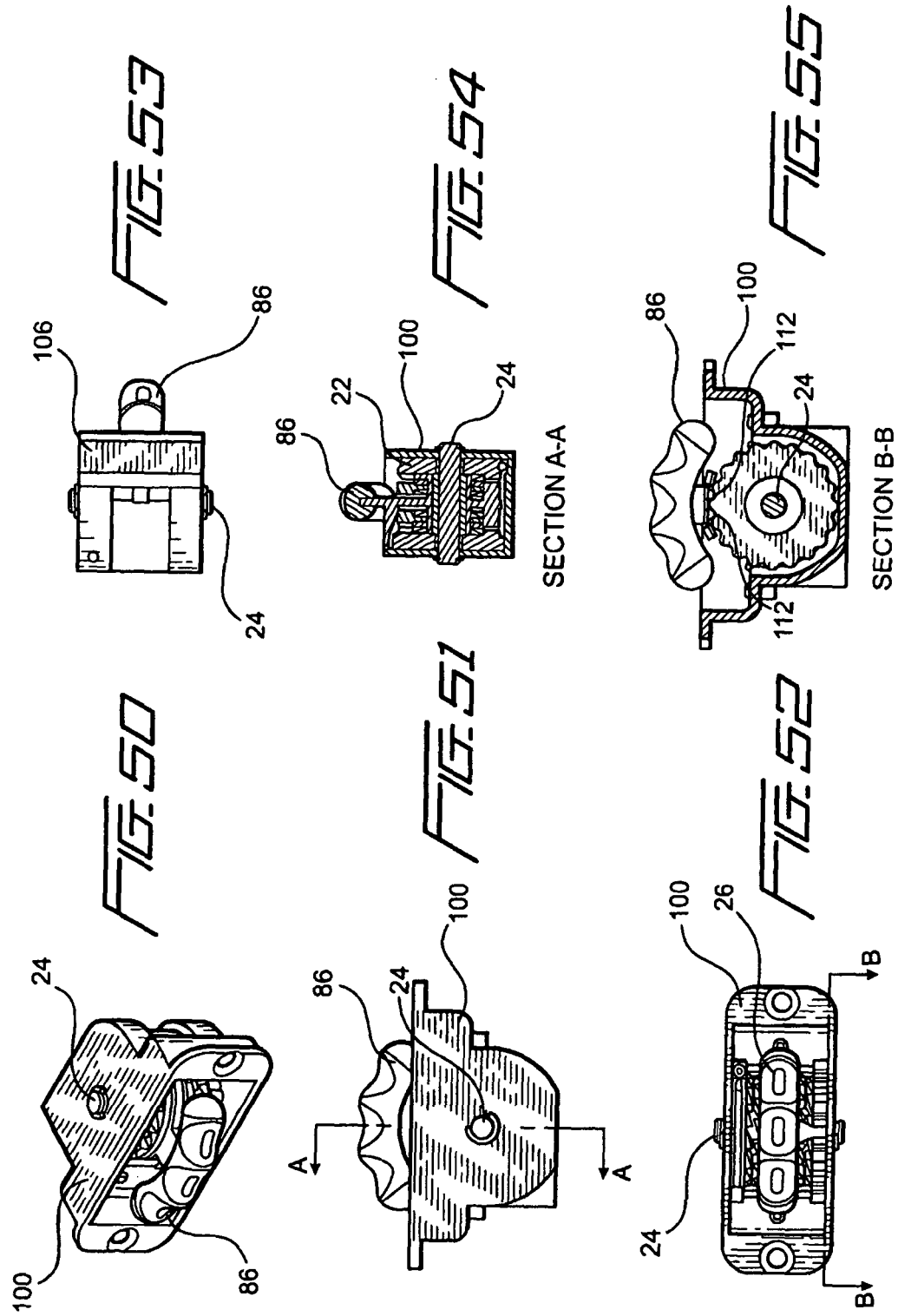

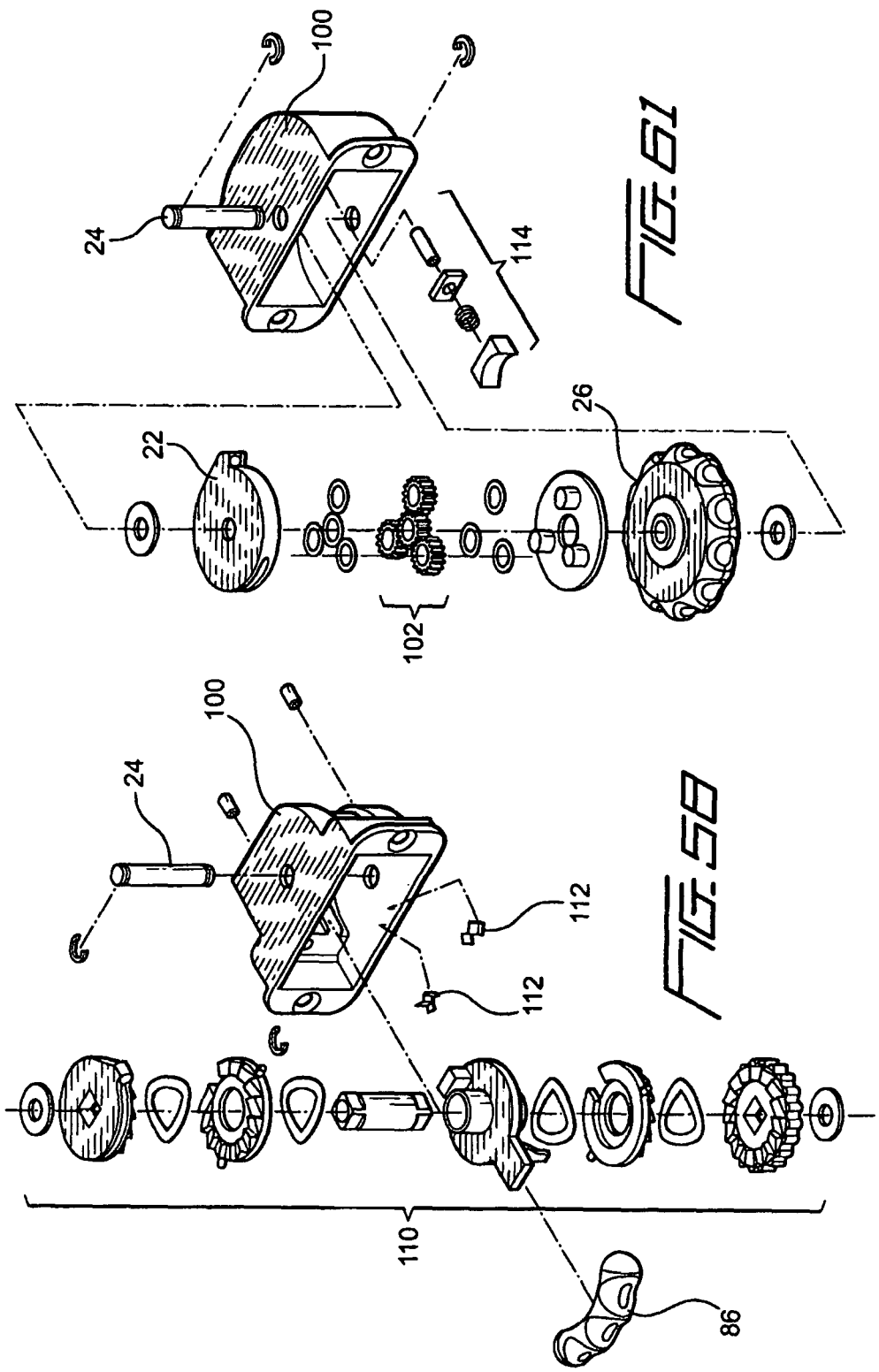

BICYCLE TRANSMISSION SHIFT CONTROL APPARATUS

CROSS-REFERENCE TO RELATED APPLICATIONS

This application claims priority from the following three provisional patent applications: Provisional Patent Application Ser. No. 60/796,187 filed May 1, 2006; Provisional Patent Application Ser. No. 60/810,128 filed Jun. 2, 2006, and Provisional Patent Application Ser. No. 60/851,997 filed Oct. 17, 2006. This application incorporates by reference as though fully set forth all subject matter contained in all three of those prior provisional patent applications.

BACKGROUND OF THE INVENTION

1. Field of the Invention

This invention relates generally to bicycle transmission shift control, and more particularly, to a bicycle handlebar mounted system incorporating a continuous cable, a twin cable or a single cable arrangement connected to a bicycle transmission derailleur so that pulling on one portion of the continuous cable, pulling on one of the twin cables or pulling on the end of the single cable at the handlebar moves the derailleur to move a drive chain from one set of gears to another. Alternatively, by pulling in a different direction on the continuous cable, pulling on the other of the twin cables or releasing tension in the single cable at the handlebar moves the derailleur to move the drive chain in the opposite direction from one set of gears to another. The bicycle handlebar mounted system of the invention also can include a mounting for a cycling computer.

2. Description of the Related Art

Many types of bicycle transmission shift devices using derailleurs have been used. Predominantly, these devices interconnect a derailleur with a shifting device using a cable and spring system. The cable can be pulled by the shifting device in one direction to move the derailleur. Alternatively, the shifting device can be operated to release tension from the cable and then the spring system acting on the cable moves the derailleur in the opposite direction.

Shifting devices that have been used include at least lever type devices and twist-grip type devices. These shifting devices have been mounted at various locations on bicycles such as frames and handlebars. These devices have been located at various positions on bicycles where a rider is supposed to easily find and operate them. As far as operation is concerned, it is desired that the shifters function easily with position feedback and do not require much force to operate.

Lever type transmission shifting devices have been mounted on bike frames or on handlebars—e.g., at the ends of handlebars and in association with brake levers. These locations for mounting lever type transmission shifting devices have not always been considered most convenient. In particular, locating these devices on bicycle frames has not always been favored because there are riders who have found them difficult to locate and operate when standing and pedaling—such as when biking up hills. Riders have also found that even mounting lever type transmission shifting devices at the ends of handlebars may not be as convenient as they require.

With respect to handlebar twist grip type transmission shifting devices, it has been found that these type systems often are heavy and therefore add bulk to handlebars. These weight and bulk consequences result from extensive gear and other mechanical arrangements required to implement such systems. The extent and complexities of such arrangements unavoidably result in lowered reliability for the grip type transmission shifting devices. Further frustrating utility of these twist grip type systems is the fact that their complexity also adversely impacts making repairs, which can be a significant issue if repairs must be made on the road.

A further alternative system involves combining a brake lever with a separate smaller lever that are mounted together so that both the brake lever and the smaller lever in combination can be deflected toward the center of the bike to move a derailleur to move the bicycle chain. The combined brake lever and smaller lever also are arranged and mounted so they can be moved back to their original positions, this return movement of the levers permits the brake lever to be deflected in order operate a brake. To have a derailleur move the bike chain in an opposite direction, the smaller lever is mounted so that it can be deflected toward the center of the bike without deflection of the brake lever. When the smaller lever is so deflected without deflection of the brake lever a mechanical system—such as a ratchet and pinion system—is operated to relieve tension on a connected derailleur cable that is spring loaded at the derailleur mounting to move the derailleur in an opposition direction. All of these combinations of mechanical arrangements, including multiple levers and functions for the levers and associated movements and operations again introduce weight and complexities.

BRIEF SUMMARY OF THE INVENTION

The present invention is directed to a transmission shifting system employing a continuous cable or a twin cable arrangement that has a pair of cable ends attached to a derailleur so that a portion of a cable can be pulled to move the derailleur and thereby move a bike chain from one set to gears to another and also so that a cable can be pulled in an opposite direction to move the derailleur and bike chain in the opposite direction for shifting gears. Specifically, two cable portions or ends are attached to a derailleur so that one cable can pull the derailleur in one direction and the other cable can pull the derailleur in a second direction. Additionally, the present invention is directed to a transmission shifting system employing a single cable that can be pulled to move the derailleur in one direction and that further can be adjusted to have tension released in the cable to allow the derailleur to move in an opposite direction.

A continuous section of cable for the continuous cable arrangement is wound around an outer surface of a drum mounted as part of an aspect of the shifting device of the present invention. The continuous cable is sized and mounted on the bicycle so as to be in a tight relationship between the drum and derailleur. The continuous cable derailleur tension relationship permits the drum to be rotated in one direction and thereby pull the cable to move the derailleur in a first direction, and also permits the drum to be rotated in the opposite direction and thereby pull the cable to move the derailleur in a second direction. According to another aspect of the invention, the drum is mounted in a handlebar brake lever housing with the cable wound around the drum. The continuous cable is fastened to the handlebar and along the bike frame so it can be pulled in opposite directions for movement. Further, the continuous cable is so sized in length and fastened that both ends of the cable are under tension when attached to a derailleur. The drum can be rotated in opposite directions using a thump wheel attached to the drum. Alternatively, the drum can be rotated in opposite directions using a ratchet wheel, separate button operated pawls, or a rack and pinion system, etc. Many different mechanisms can be used to effect and control rotation of the drum in opposite directions.

In the case of the twin cable arrangement, a first pair of ends of the twin cables are attached about an outer surface of a drum mounted as part of an aspect of the shifting device of the present invention. The pair of cables are sized and mounted on the bicycle so as to be in a tight relationship between the drum and derailleur where a second pair of cable ends are attached. The cable derailleur tension relationship permits the drum to be rotated in one direction and thereby pull one cable to move the derailleur in a first direction, and also permits the drum to be rotated in the opposite direction and thereby pull the other cable to move the derailleur in a second direction. According to another aspect of the invention, the drum is mounted in a handlebar brake lever housing with the pair of cables attached around the drum. The pair of cables are fastened to the handlebar and along the bike frame so that they can be pulled for movement. Further, the twin cables also are so sized in length and fastened that ends of the cables can be attached under tension to a derailleur. The drum can be rotated in opposite directions using a thump wheel attached to the drum. Alternatively, the drum can be rotated in opposite directions using a ratchet wheel, separate button operated pawls, or rack and pinion systems, etc. Many different mechanisms can be used to effect and control rotation of the drum in opposite directions.

An additional arrangement according to the present invention for a twin cable system has each first end of twin cables attached about an outer surface of separate drums. Again, the pair of cables are sized and mounted on the bicycle so as to be in tight relationship between their respective drums and a derailleur where a second pair of cable ends are attached. The cable derailleur tension relationships permit the separate drums to be rotated so that one cable is pulled to move the derailleur in a first direction, and also permits the drums to be rotated in opposite directions and thereby pull the other cable to move the derailleur in a second direction. The drums are mounted in a handlebar brake lever housing with the pair of cables attached around them. Alternatively, a single cable and a single drum mounted in a handlebar brake lever housing can be utilized. In this situation the single cable is connected to a derailleur having a spring to keep tension in the cable and to move the derailleur to change gears for the drive chain when tension is released in the cable by rotating the drum. The drums of a twin cable system or the drum of a single cable system can be rotated in opposite directions using a ratchet wheel, separate button operated pawls, or rack and pinion systems, etc. Many different mechanisms can be used to effect and control rotation of the drums or drum in opposite directions.

The handlebar brake lever housing of the invention can include a portion raised above the brake lever to support a biker hand that is holding the handlebar brake lever housing. This raised portion or horn of a handlebar brake lever housing can be used for mounting a cycling computer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 is a partial cross-section side view of a transmission shifting device according to the present invention;

FIG. 2 is a partial cross-section side view of a transmission shifting device according to another aspect of the invention;

FIG. 3 is a; partial cross-section side view of a transmission shifting device according to yet another aspect of the invention;

FIG. 4 is a partial cross-section bottom view of the transmission shifting device shown in FIG. 3;

FIG. 5 is a plan side view of a cable drum and ratchet wheel arrangement according to the present invention;

FIG. 7 is a top view of the transmission shifting device shown in FIG. 6;

FIG. 9 is a top view of the transmission shifting device shown in FIG. 8;

FIG. 10 is a side view of a pinion arrangement to drive separate drums;

FIG. 14 is a perspective view of a thumb wheel transmission shifting device mounted in a brake handle housing according to an aspect of the invention;

FIG. 15 is a partial exploded perspective view of a thumb wheel transmission shifting device mounted in a brake handle housing according to an aspect of the invention;

FIG. 16 is a perspective view of a push button transmission shifting device mounted in a brake handle housing according to an aspect of the invention;

FIG. 18 is a perspective view of a thumb wheel system for a transmission shifting device according to an aspect of the invention;

FIG. 19 is a front plan view of the transmission shifting device shown in FIG. 18;

FIG. 20 is a top plan view of the transmission shifting device shown in FIG. 18;

FIG. 21 is a side plan view of the transmission shifting device shown in FIG. 18;

FIG. 22 is a sectional view taken on line A-A of the transmission shifting device shown in FIG. 19;

FIG. 23 is a sectional view taken on line B-B of the transmission shifting device shown in FIG. 20;

FIG. 31 is a top exploded view of the transmission shifting device shown in FIG. 25;

FIG. 32 is a bottom exploded view of the transmission shifting device shown in FIG. 25;

FIG. 33 is an exploded view of a thumb wheel and interchangeable cog gears for the transmission shifting device shown in FIG. 25;

FIG. 34 is a perspective view of a thumb wheel system for a transmission shifting device according to an aspect of the invention;

FIG. 35 is a plan front view of the transmission shifting device shown in FIG. 34;

FIG. 36 is a side plan view of the transmission shifting device shown in FIG. 34;

FIG. 37 is a top plan view of the transmission shifting device shown in FIG. 34;

FIG. 38 is a sectional view taken on line A-A of the transmission shifting device shown in FIG. 35;

FIG. 39 is a sectional view taken on line B-B of the transmission shifting device shown in FIG. 36

FIG. 40 is a sectional view taken on line C-C of the transmission shifting device shown in FIG. 37;

FIG. 41 is an exploded view of the transmission shifting device shown in FIG. 34;

FIG. 42 is a perspective view of a push button system for a transmission shifting device according to an aspect of the invention;

FIG. 43 is front plan view of the transmission shifting device shown in FIG. 42;

FIG. 44 is a top plan view of the transmission shifting device shown in FIG. 42;

FIG. 45 is a sectional view taken on line A-A of the transmission shifting device shown in FIG. 43;

FIG. 46 is a sectional view taken online D-D of the transmission shifting device shown in FIG. 44;

FIG. 47 is a side plan view of the transmission shifting device shown in FIG. 42;

FIG. 48 is an exploded view of the transmission shifting device shown in FIG. 42;

FIG. 49 is a perspective view of a ratchet system transmission shifting device mounted in a brake handle housing according to an aspect of the invention;

FIG. 50 is a perspective view of a ratchet system transmission shifting device according to an aspect of the invention;

FIG. 51 is a top plan view of the transmission shifting device shown in FIG. 50;

FIG. 52 is a front plan view of the transmission shifting device shown in FIG. 50;

FIG. 53 is a side plan view of the transmission shifting device shown in FIG. 50;

FIG. 54 is a sectional view taken on line A-A of the transmission shifting device shown in FIG. 51;

FIG. 55 is a sectional view taken on line B-B of the transmission shifting device shown in FIG. 52;

FIG. 58 is an exploded view of the transmission shifting device shown in FIG. 50;

FIG. 61 is an exploded view of the transmission shifting device with an adjustable friction brake system as shown in FIG. 59.

DETAILED DESCRIPTION OF THE INVENTION

Figure 6:
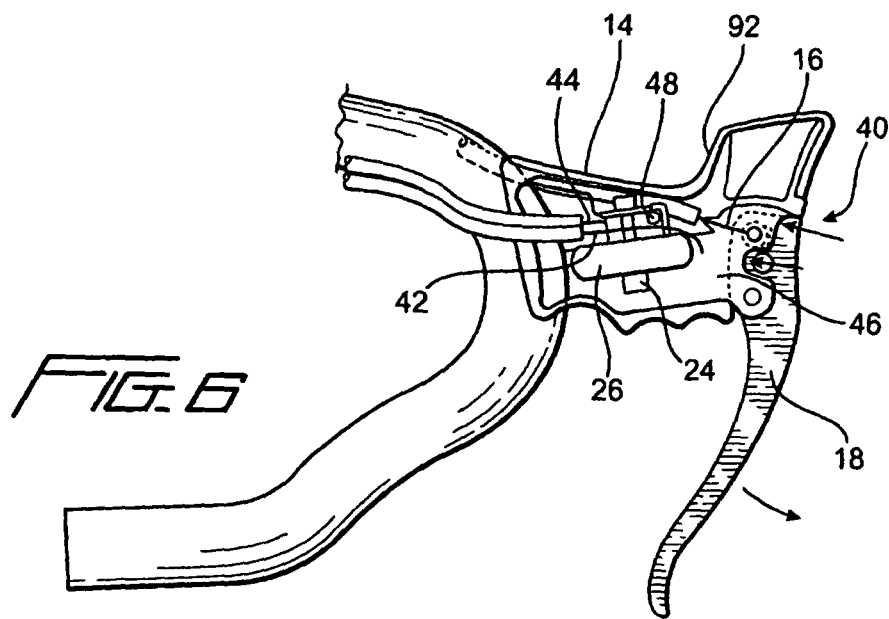
FIG. 6 is a partial cross-section side view of a transmission shifting device according to the present invention.

A bicycle transmission shifting device according to the present invention is shown in FIG. 1, where the shifting device is designated with the general numeral 10. Shown in FIG. 1 are a handlebar 12, brake handle housing 14, brake cable 16, brake lever 18, and transmission cable 20. Transmission cable 20 as shown in FIG. 1 is a continuous cable with two ends connected to a derailleur (not shown). One end of transmission cable 20 is connected to the derailleur so that when that end of the cable is pulled the derailleur is moved to have a bike chain (not shown) change its location on a set of gears (not shown). The other end of transmission cable 20 also is connected to the derailleur so that when that end of the cable is pulled the derailleur is moved to have the bike chain change its location in a different direction on the set of gears.

Within brake handle housing 14 a cable drum 22 is mounted on pin 24 so that cable drum 22 can rotate. A section of transmission cable 20 is wrapped around cable drum 22 so that when cable drum 22 is rotated in one direction an end of transmission cable 20 is pulled toward the brake handle housing 14. Alternatively, if the cable drum 22 is rotated in the opposite direction the other end of transmission cable 20 is pulled toward the brake handle housing 14. This use of a continuous transmission cable 20 with rotatable cable drum 22 permits both ends of transmission cable 20 to be connected to a derailleur for moving the derailleur in opposite directions. In particular, this use of a continuous transmission cable 20 with rotatable cable drum 22 eliminates the need for a spring or spring system at the derailleur that is used when a single cable with only one end available at the derailleur is used. There is a need for a strong spring in this situation because when only one cable end is available at a derailleur, that derailleur can be pulled by the cable in only one direction. To move the derailleur in another direction, the tension in the cable can be reduced and a spring in combination with reduced cable tension is used to so move the derailleur.

A thumb wheel 26 is shown in FIG. 1 for rotating the cable drum 22. This thumb wheel 26 is fixedly attached to the cable drum 22, and this thumb wheel 26 extends outside the brake handle housing 14 so that a biker riding the bicycle can easily rotate the thumb wheel 26 and thereby rotate the cable drum 22 in either direction. Such rotation of cable drum 22 pulls a transmission cable 20 in one direction or the other direction to move the derailleur in one direction or the other.

An aspect of the invention is shown in FIG. 2. Here again a cable drum 22 is shown mounted on a pin 24 so it can be rotated, and a transmission cable 20 is shown wrapped about the cable drum 22. Unlike the transmission shifting device 10 shown in FIG. 1, the transmission shifting device 10 shown in FIG. 2 has the thumb wheel 26 that is attached to the cable drum 22 mounted so that the cable drum 22 is above the thumb wheel 26 instead of below it. Further shown in FIG. 2 is a combined spring 28 and ball 30 system arranged to position the ball 30 in detents formed in the thumb wheel 26. This arrangement of spring 28, ball 30 and detents provides a positive feedback to a biker as the thumb wheel 26 is turned. The spring 28, ball 30 and detents can also be incorporated for use with the thumb wheel 26 shown in FIG. 1.

A further alternative arrangement to rotate cable drum 22 is shown in FIGS. 3 and 4. Here a pair of ratchet wheels 32 and pawls 34 are shown with push buttons 36 arranged to operate pawls 34 in conjunction with ratchet wheels 32. The ratchet wheels 32 are fixedly attached to the cable drum 22, and each push button 36 moves a pawl 34 to rotate a ratchet wheel 32. The pair of ratchet wheels 32, pawls 34 and push buttons 36 are used to effect rotation of cable drum 22 in opposite directions. As shown in FIG. 3 the ratchet wheels are mounted adjacent each other with the cable drum 22 mounted above. These arrangements can be altered to have the ratchet wheels 32 on top of the cable drum 22 or to have one ratchet wheel 32 on top and the other ratchet wheel 32 below (see FIG. 5). Again, a spring 28, ball 30 and detent system could be used where the detents are included in a ratchet wheel 32 or in cable drum 22.

Further aspects of the invention are shown in FIGS. 6 and 7. A bicycle transmission shifting device according to the present invention here is shown, and this shifting device is designated with the general numeral 40. Shown in FIG. 6 are a handlebar 12, brake handle housing 14, brake cable 16, brake lever 18, and a pair of transmission cables 42 and 44. Each of transmission cables 42 and 44 has a first end connected to a derailleur (not shown). These first ends of transmission cables 42 and 44 are connected to the derailleur so that when one first end is pulled the derailleur is moved to have a bike chain (not shown) change its location on a set of gears (not shown). The other first end is connected to the derailleur so that when that end is pulled the derailleur is moved to have the bike chain change its location in a different direction on the set of gears.

Within brake handle housing 14, the cable drum 22 is mounted on pin 24 so that cable drum 22 can rotate. Second ends 46 and 48 of transmission cables 42 and 44 are respectively attached to cable drum 22 so that when cable drum 22 is rotated in one direction the first end of transmission cable 42 is pulled toward the brake handle housing 14. Alternatively, if the cable drum 22 is rotated in the opposite direction the first end of transmission cable 44 is pulled toward the brake handle housing 14. This use of the pair of transmission cables 42 and 44 with rotatable cable drum 22 permits both first ends of the transmission cables 42 and 44 to be connected to a derailleur for moving the derailleur in opposite directions. Again, this use of the pair of transmission cables 42 and 44 with rotatable cable drum 22 eliminates the need for a spring or spring system at the derailleur that is required when a single cable with only one end available at the derailleur is used.

A thumb wheel 26 is shown in FIGS. 6 and 7 for rotating the cable drum 22. This thumb wheel 26 is fixedly attached to the cable drum 22, and this thumb wheel 26 extends outside the brake handle housing 14 so that a biker riding the bicycle can easily rotate the thumb wheel 26 and thereby rotate the cable drum 22 in either direction. Such rotation of cable drum 22 pulls one of the transmission cables 42 and 44 in one direction or the other direction to move the derailleur in one direction or the other.

As shown in FIG. 7, thumb wheel 26 includes indents 50. These indents 50 are registered in positions corresponding to gear selections. A leaf spring 52 is mounted in brake handle housing 14 so that a knob end is positioned to engage an indent 50 when the derailleur sets the bike chain at a specific gear setting. This arrangement conveniently and positively advises the bicycle rider when the derailleur in positioned to set the bike chain at a specific gear setting.

Figure 8:
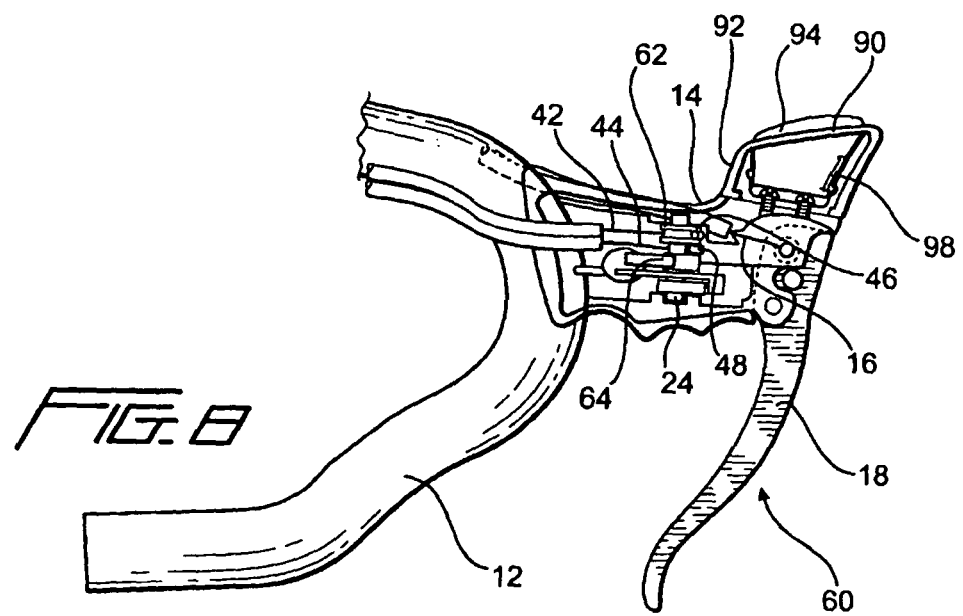
FIG. 8 is a partial cross-section side view of a transmission shifting device according to the present invention.

Still further aspects of the invention are shown in FIGS. 8-13. A bicycle transmission shifting device according to the present invention here is shown, and this shifting device is designated with the general numeral 60. Shown in FIG. 8 are a handlebar 12, brake handle housing 14, brake cable 16, brake lever 18, and a pair of transmission cables 42 and 44. Each of transmission cables 42 and 44 has a first end connected to a derailleur (not shown). These first ends of transmission cables 42 and 44 are connected to the derailleur so that when one first end is pulled the derailleur is moved to have a bike chain (not shown) change its location on a set of gears (not shown). The other first end is connected to the derailleur so that when that end is pulled the derailleur is moved to have the bike chain change its location in a different direction on the set of gears.

Within brake handle housing 14 is pin 24 on which a pair of drums 62 and 64 are mounted. These drums 62 and 64 are mounted on pin 24 so that they can be rotated independently of each other in opposite directions. Second ends 46 and 48 of transmission cables 42 and 44 are respectively attached to cable drum 62 and cable 64. Therefore, when cable drum 62 is rotated in one direction the first end of transmission cable 42 is pulled toward the brake handle housing 14. Alternatively, if cable drum 64 is rotated the first end of transmission cable 44 is pulled toward the brake handle housing 14. This use of the pair of transmission cables 42 and 44 with independent rotatable cable drums 62 and 64 permits both first ends of transmission cables 42 and 44 to be connected to a derailleur for moving the derailleur in opposite directions. Again, this use of the pair of transmission cables 42 and 44 with independently rotatable cable drums 62 and 64 eliminates the need for a spring or spring system at the derailleur that is required when a single cable with only one end available at the derailleur is used.

For those skilled in this art it will be understood that a single transmission cable such as transmission cable 42 can be used with a derailleur having an appropriate known spring system. The transmission cable 42 would be connected to cable drum 62 with a load brake system (not shown) to release tension on transmission cable 42, and cable drum 64 could be eliminated. This arrangement would reduce parts in the brake handle housing 14.

Alternative mechanisms are disclosed here from those described above for rotating cable drums 62 and 64. As will be appreciated by those skilled in this art, the above described mechanisms for rotating cable drums also can be applied here.

Figure 12:
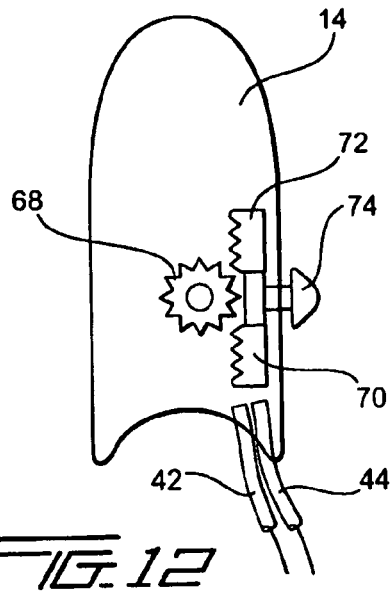
FIG. 12 is a top view of a rack and pinion system to rotate a drum.

Shown in FIG. 10 are pinions 66 and 68 these are respectively attached to cable drums 62 and 64. So that when pinion 66 is rotated about pin 24, the cable drum 62 also rotates in the same direction about pin 24. Identically, pinion 68 and cable drum 64 are connected. A rack arrangement can be used to rotate pinions 66 and 68. Such an arrangement is shown in FIGS. 9 and 12, where upper rack 70 is aligned to drive pinion 66 and lower rack 72 is aligned to drive pinion 68. A biker can move the racks 70 and 72 by moving attached rack buttons 74. These rack buttons 74 can be ergonomically designed to facilitate operation by a biker. For example, see double hump rack button 76 shown in FIG. 9.

Figure 11:
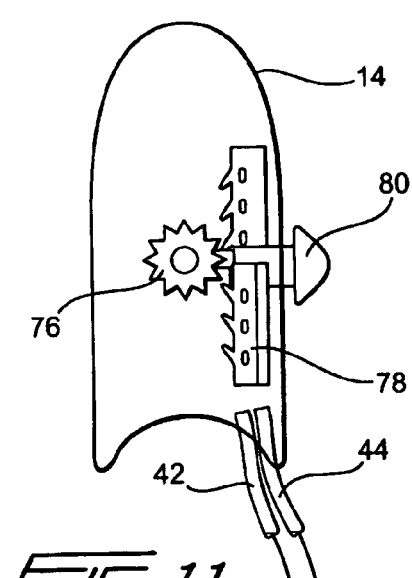
FIG. 11 is a top view of a tooth and pall system to rotate a drum.

As an alternative to a rack and pinion system to rotate cable drums 62 and 64, a cog and pall system as shown in FIG. 11 can be used. Here each cable drum is attached to a cog 76, and the cogs are rotated using an aligned set of palls 78. There being a set of palls 78 for each cog 76. The palls 78 are moved using pall buttons 80.

To further facilitate biker rotation of the cable drums 62 and 64, a reduction gear arrangement 82 can be aligned with a pair of drive gears 84 that are respectively connected to each of cable drum 62 and 64. (See FIG. 13) A biker operates reduction gear arrangement 82 by moving a lever 86 that extends from brake handle housing 14.

The alternative mechanisms described above for rotating cable drum 22 when used with continuous transmission cable 20 are also applicable for rotating cable drum 22 when it is used with the pair of transmission cables 42 and 44 or a single transmission cable. Further, the alternative mechanisms described above for rotating cable drums 62 and 64 also are applicable to arrangements with continuous transmission cables, paired or single transmission cables.

Figure 17:
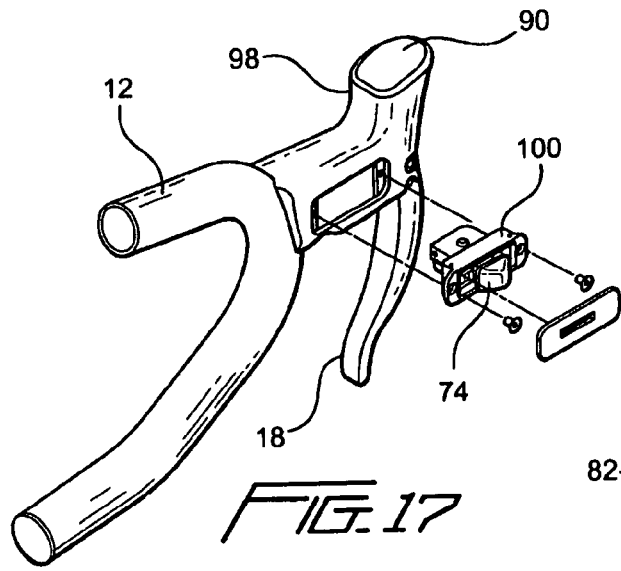
FIG. 17 is a partial exploded perspective view of a push button transmission shifting device mounted in a brake handle housing according to an aspect of the invention.
Figure 13:
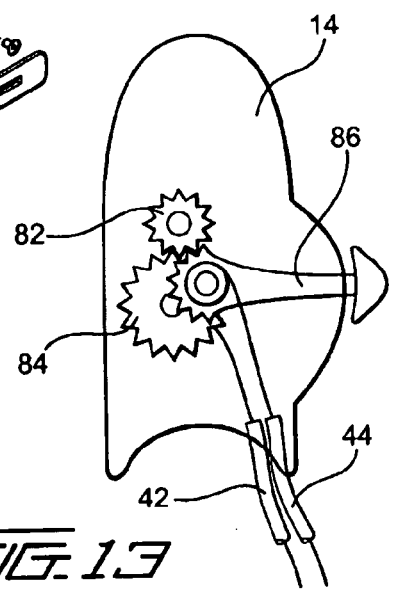
FIG. 13 is a top view of a reduction gear arrangement with short swing lever to rotate a drum.

Further aspects for mechanisms for rotating cable drums are shown in FIGS. 14 through 61. A single cable drum is shown in these figures, and this cable drum is marked with element number 22. It is to be understood that the described alternative mechanisms shown in these figures can be arranged for use with a continuous transmission cable 20, a pair of transmission cables 42 and 44 or a single transmission cable through modifications of cable drums. Aspects for thumb wheel systems for rotating cable drums are shown in FIGS. 14, 15, 22-41 and 59-61, aspects for rack and pinion systems are shown in FIGS. 16, 17 and 42-48, and aspects for ratchet systems are shown in FIGS. 49-58. Each of these systems is shown as assembled in a transmission shifting device housing 100 as shown in FIGS. 15, 17 and 49 and other drawings.

The thumb wheel system shown in FIGS. 18-24 includes a multiple gear 102 system (see FIGS. 22 and 24) to facilitate rotation of thumb wheel 26 and thereby cable drum 22.

The thumb wheel system shown in FIGS. 25-33 includes interchangeable cog gears 104 (see FIG. 33). Each of the interchangeable cog gears 104 include tooth spacing determined by derailleur operation so that spring clip 106 can be positioned within a tooth spacing and advancing thumb wheel 26 to rotate an interchangeable cog gear 104 that is attached to thumb wheel 26 by one tooth spacing causes an associated derailleur to move by one transmission setting. Accordingly, if a derailleur is replaced with a different manufacturer's derailleur the interchangeable cog gear 104 also can be changed to maintain registration between thumb wheel 26 rotation and derailleur settings. In this way the thumb wheel system can readily be adapted to a changed derailleur so as to operate with correct registration.

The thumb wheel system shown in FIGS. 34-41 includes a thumb wheel reduction gear system to facilitate rotation of thumb wheel 26 and thereby associated cable drum 22.

The ratchet system shown in FIGS. 49-58 includes a ratchet gear system 110 with retention and release clips 112.

Figure 59:
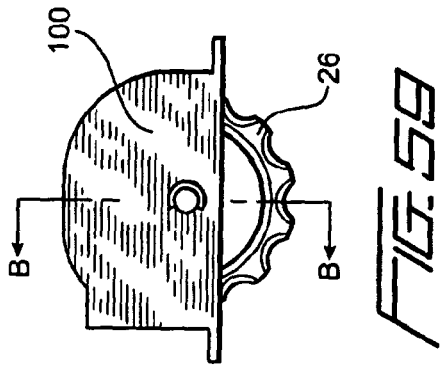
FIG. 59 is a top plan view of a housing for an aspect of the transmission shifting device shown in FIG. 18.
Figure 60:
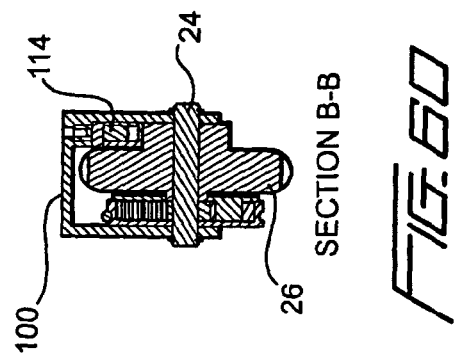
FIG. 60 is a sectional view taken on line B-B of the transmission shifting device with an adjustable friction brake system as shown in FIG. 59.
Figure 56:
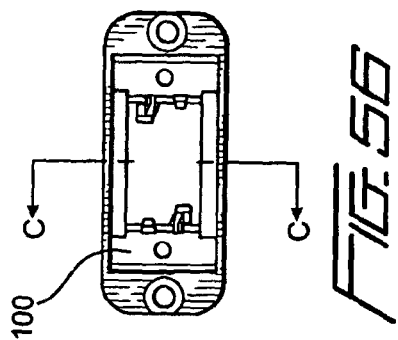
FIG. 56 is a front plan view of a housing for the transmission shifting device shown in FIG. 52.
Figure 57:
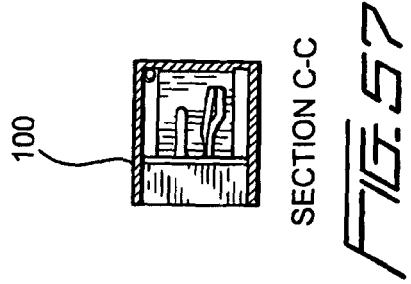
FIG. 57 is a sectional view taken on line C-C of the transmission shifting device housing shown in FIG. 56.
Figure 24:
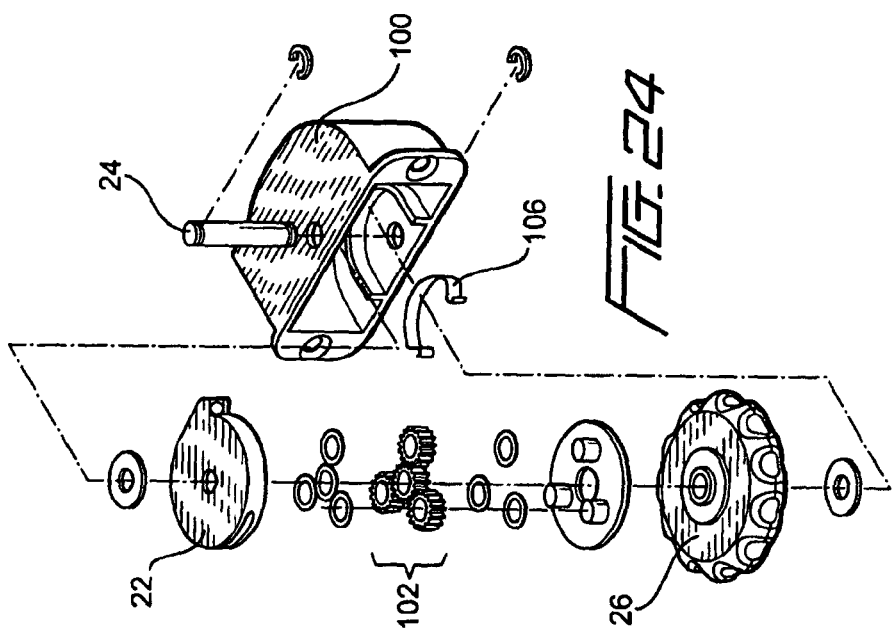
FIG. 24 is an exploded view of the transmission shifting device shown in FIG. 18.
Figure 25:
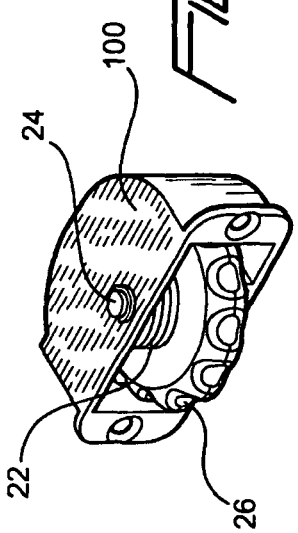
FIG. 25 is a perspective view of a thumb wheel system for a transmission shifting device according to an aspect of the invention.
Figure 26:
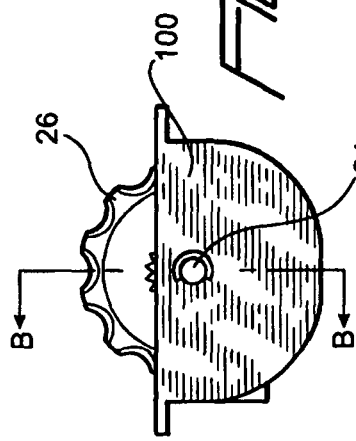
FIG. 26 is a top plan view of the transmission shifting device shown in FIG. 25.
Figure 27:
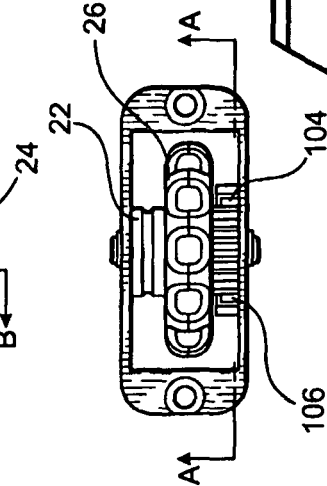
FIG. 27 is a front plan view of the transmission shifting device shown in FIG. 25.
Figure 28:
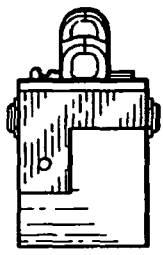
FIG. 28 is a side plan view of the transmission shifting device shown in FIG. 25.
Figure 29:
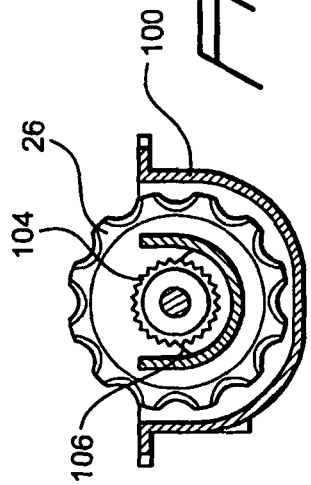
FIG. 29 is a sectional view taken on line A-A of the transmission shifting device shown in FIG. 27.
Figure 30:
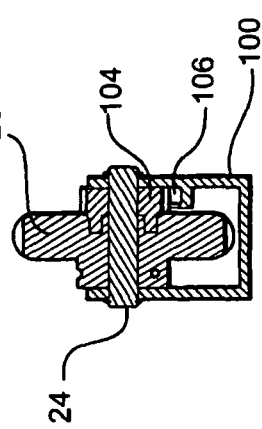
FIG. 30 is a sectional view taken on line B-B of the transmission shifting device shown in FIG. 26.

The thumb wheel system shown in FIGS. 59-61 include an adjustable friction brake system 114 as shown in FIGS. 60 and 61 that provides an analog registration system as opposed to the gear 104 and spring clip 106 system shown in at least FIGS. 25-33.

Included as a part of the shapes of brake handle housings 14 shown in FIGS. 1, 2, 3 and 6 are a raised portion or horn 90. Among other purposes that these horns 90 can provide is a firm restraining support surface 92 for biker hands (not shown) that hold brake handle housings 14. Additionally, these horns 90 can be used to mount cycle computers 94 for convenient use and viewing by bikers. (see FIG. 1) Cycle computers 94 are known battery operated portable electronic devices with displays to monitor and report cyclist physiological and cycling data such as heart rate, calorie consumption, distance cycled, and speed. Other data also can be provided such as altimeter, barometer, thermometer, compass, Global Positioning System (GPS) data, including latitude, longitude and way points, etc. These cycle computers 94 typically are small and light weight. They can be mounted on a bike, but such bike mountings need to be at convenient locations where a biker can readily operate their keypads to control displayed data and also where a biker can readily see displayed data without having to move their hands great distances or move their hands and eyes to inconvenient or distracting locations. The present invention provides such a convenient and useful location at the brake handle housing 14 where a biker hand normally is positioned. Specifically, horn 90 is opened on the top to provide space for positioning and mounting a cycle computer 94 (see FIG. 1). To mount a cycle computer 94 in horn 90 a cycle computer holster 96 is mounted to the brake handle housing 14. Such a holster 96 can be made of plastic or other material as is known in the art to permit both secure and convenient mounting and dismounting of a cycle computer 94 from the horn 90. Another arrangement is shown in FIG. 8. Here a computer lock/release clip 98 is shown to retain a cycle computer 94.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A bicycle shifting device comprising:
    a housing;
    an effort reducing transmission mounted on said housing;
    a cable mounting device mounted for rotational movement;
    a cable mounted on said cable mounting device and connected to said effort reducing transmission; and
    a thumb wheel connected to said effort reducing transmission by said cable; and
    wherein said effort reducing transmission facilitates rotation of said thumb wheel and thereby said cable mounting device and rotation of said thumb wheel, causes rotation of said cable mounting device by movement of the cable between said effort reducing transmission and said thumb wheel.

2. A bicycle shifting device according to claim 1 wherein said effort reducing transmission is a planetary gear system.

3. A bicycle shifting device according to claim 2 wherein said cable mounting device is a cable drum.

4. The bicycle shifting device according to claim 2, wherein said planetary gear system includes four gears.

5. The bicycle shifting device according to claim 2, wherein said planetary gear system includes at least three gears.

6. A bicycle shifting device comprising:
a housing;
an effort reducing transmission mounted on said housing;
a cable mounting device mounted for rotational movement;
two cables mounted on said cable mounting device and connected to said effort reducing transmission; and
a thumb wheel connected to said effort reducing transmission by one said cable; and
wherein said effort reducing transmission facilitates rotation of said thumb wheel and thereby said cable mounting device and rotation of said thumb wheel, causes rotation of said cable mounting device by movement of the two cables located between said effort reducing transmission and said thumb wheel.

7. The bicycle shifting device according to claim 6 wherein said cable mounting device includes a mounting arrangement for connecting two cables to said cable mounting device.

8. The bicycle shifting device according to claim 7, wherein said cable mounting device comprises first and second cable drums.

9. The bicycle shifting device according to claim 8, wherein a first said cable is mounted on said first cable drum and a second said cable is mounted on said second cable drum.

10. The bicycle shifting device according to claim 9, wherein said first and second cable drums are independently rotatable.

11. A bicycle shifting device according to claim 2, wherein said effort reducing transmission is a planetary gear system.

12. A bicycle shifting device according to claim 11, wherein said cable mounting device is a cable drum.

13. The bicycle shifting device according to claim 11, wherein said planetary gear system includes at least three gears.

14. The bicycle shifting device according to claim 11, wherein said planetary gear system includes four gears.

* * * * *